United States Patent [19]
Periou et al.

[11] Patent Number: 4,723,454
[45] Date of Patent: Feb. 9, 1988

[54] LOCKING ACTUATOR FOR A LATCH OF A VEHICLE DOOR

[75] Inventors: Pierre Periou, Clichy; Richard Grandjean, Saint-Die, both of France

[73] Assignee: Compagnie Industrielle de Mecanismes en abrege C.I.M., France

[21] Appl. No.: 887,510

[22] Filed: Jul. 21, 1986

[30] Foreign Application Priority Data

Jul. 22, 1985 [FR] France ............................... 85 11189

[51] Int. Cl.[4] .......................... F16H 25/20; E05R 3/00
[52] U.S. Cl. ................................ 74/89.15; 292/336.3; 292/201
[58] Field of Search .............................. 74/625, 89.15; 292/336.3, 201; 70/264

[56] References Cited

U.S. PATENT DOCUMENTS

| | | | |
|---|---|---|---|
| 3,710,632 | 1/1973 | Tucker | 74/625 |
| 4,131,306 | 12/1978 | Sokoly et al. | 292/201 |
| 4,135,377 | 1/1979 | Kleefeldt et al. | 292/201 |
| 4,257,634 | 3/1981 | Kleefeldt et al. | 292/336.3 |
| 4,364,249 | 12/1982 | Kleefeldt | 70/264 |
| 4,440,006 | 4/1984 | Kleefeldt | 70/264 |
| 4,519,227 | 5/1985 | Dumbser et al. | 70/264 |
| 4,601,500 | 7/1986 | Bernard | 292/336.3 |

FOREIGN PATENT DOCUMENTS

| | | | |
|---|---|---|---|
| 2144796 | 3/1985 | United Kingdom | 292/336.3 |

*Primary Examiner*—Lawrence J. Staab

[57] ABSTRACT

The actuator comprises the following elements:

(a) an electric motor (2) capable of driving in rotation a reversible lead-screw (3) on which is mounted a carriage (4) which is freely slidable and mechanically connected to a lever for locking the latch;

(b) a nut (6) mounted on the lead-screw (3) within the carriage, prevented from rotating by a guiding of the nut within the carriage and provided, on one hand, with an elastically yieldable element (7) compressible between the carriage (4) and the screw (3) so as to return the nut (6) when the element (7) is compressed, and, on the other hand, with a stud (8) adapted to cooperate with ramps (9, 10, 11, 12) formed on a cam (13) vertically movable in the case by the movement in translation of the nut (6) and the stud (8) controlling the cam (13);

(c) the cam (13) is provided with a shoe (15) capable of bolting the carriage (4) in the electrically locked position when it has been displaced to its uppermost position by the stud (8) sliding on the ramps, whereby any manual unlocking of the latch is prevented.

8 Claims, 28 Drawing Figures

FIG. 2
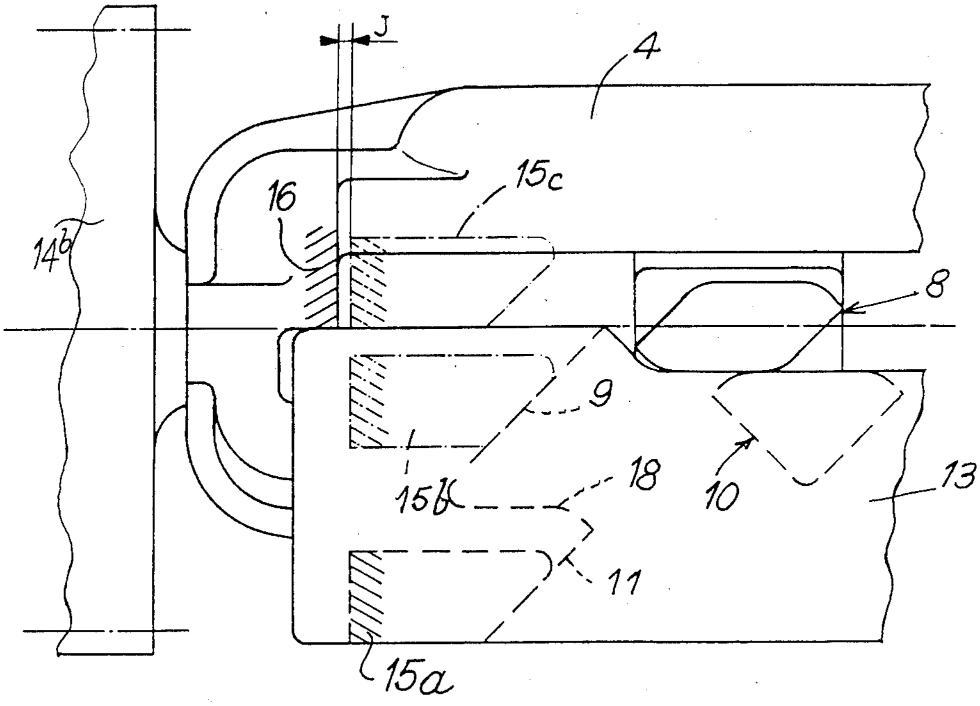
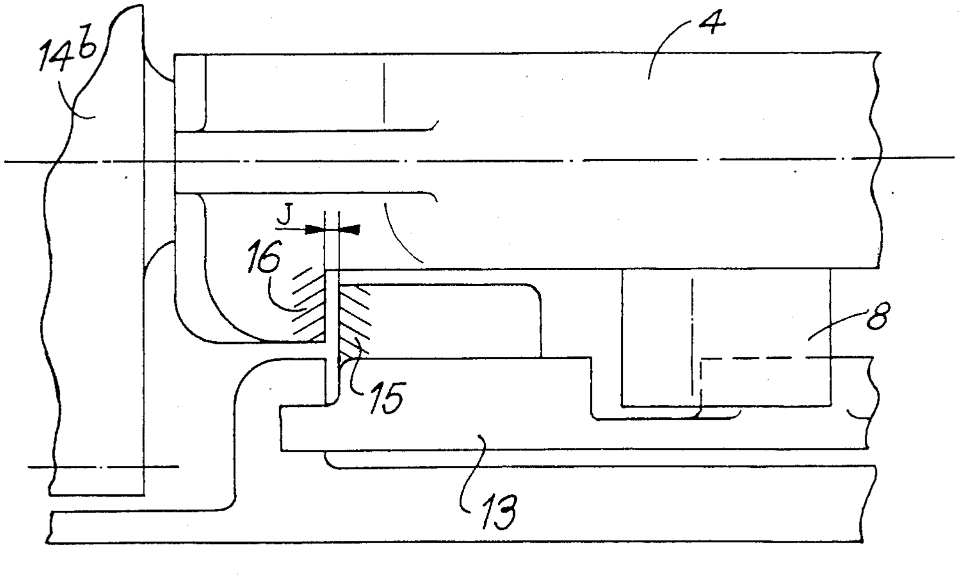
FIG. 3

8
9
10
11
12
19

9
11
12
21
22
21a
21b
21d
22a
22b
22c
22d
d
23
24
26
26a
26b
31
32

LOCKING ACTUATOR FOR A LATCH OF A VEHICLE DOOR

The present invention relates to a locking actuator of the reversible type for a vehicle door latch.

Reversible or releasable locking actuators are known which are fixed on the latch or on the door and act directly or through a linkage on the locking lever of the latch which may be shifted by a trimming edge pull-member (interior locking control) and by the outer lock (mechanical safety device).

These systems permit, on one hand, the electric locking-unlocking of the latch by the actuator, and, on the other hand, the manual locking-unlocking by means of the trimming edge pull-member or the exterior lock. Their drawback is the fact that they permit an unlocking by a picking of the lever locking the latch or by action on the trimming edge pull-member after for example breaking or passing around a door window glass, so that they do not afford an anti-theft function.

There is also known an actuator performing an anti-theft function, such as that disclosed in French Pat. No. 2 452 563 (80 06 150). This releasable actuator has two drawbacks: in order to detect the locked position it requires an electric switch at least per apparatus and its overall size is excessive bearing in mind the available space.

An object of the invention is to provide an actuator which performs the anti-theft function and avoids the aforementioned drawbacks.

According to the invention, the locking actuator comprises the following elements, disposed in a case:

(a) an electric motor capable of driving in rotation a reversible lead-screw on which is mounted a carriage which is freely slidable and mechanically connected to a lever for locking the latch;

(b) a nut mounted on the lead-screw inside the carriage, prevented from rotating by a guiding thereof in the carriage, and provided with, on one hand, an elastically yieldable element capable of being compressed between the carriage and the lead-screw so as to return the nut when this element is compressed, and, on the other hand, a stud adapted to be cooperative with the ramps formed on a cam vertically movable in the case by the movements of translation of the nut and the stud controlling the cam;

(c) the cam is provided with a shoe capable of bolting the carriage in the electrically locked position when it has been shifted to its uppermost position by the stud sliding on said ramps, thereby preventing any manual unlocking of the latch.

Thus it will be understood that the combination of the stud of the nut, the cam and its shoe with the carriage enables the actuator to effect, in addition to the electric and manual locking and unlocking functions of the latch, the immobilization by a bolting of the carriage in the locked position, preventing any manual unlocking of the latch. The anti-theft function is thus ensured; the actuation of this device both in the bolting director and in the unbolting direction with respect to the carriage can only be brought about electrically by a special operation within the control system or by specific means, such as for example a remote control.

Further features and advantages of the invention will be apparent from the following description with reference to the accompanying drawings which illustrate several embodiments thereof by way of non-limiting examples. In the drawings.

Figure 1:
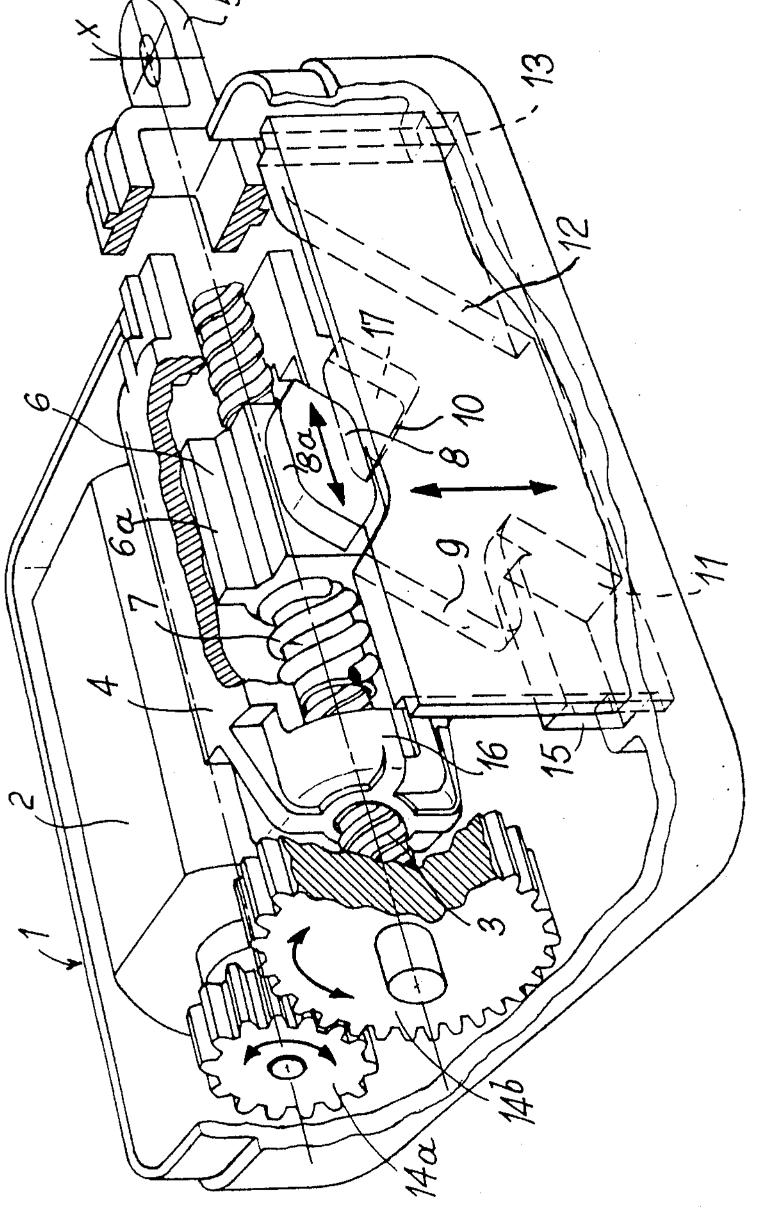
FIG. 1 is a perspective view, with a part cut away, of a first embodiment of the locking actuator according to the invention.
Figure 5:
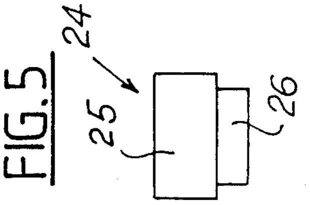
Figures 2A, 2B, 2C, 2D, 2E, 2F:
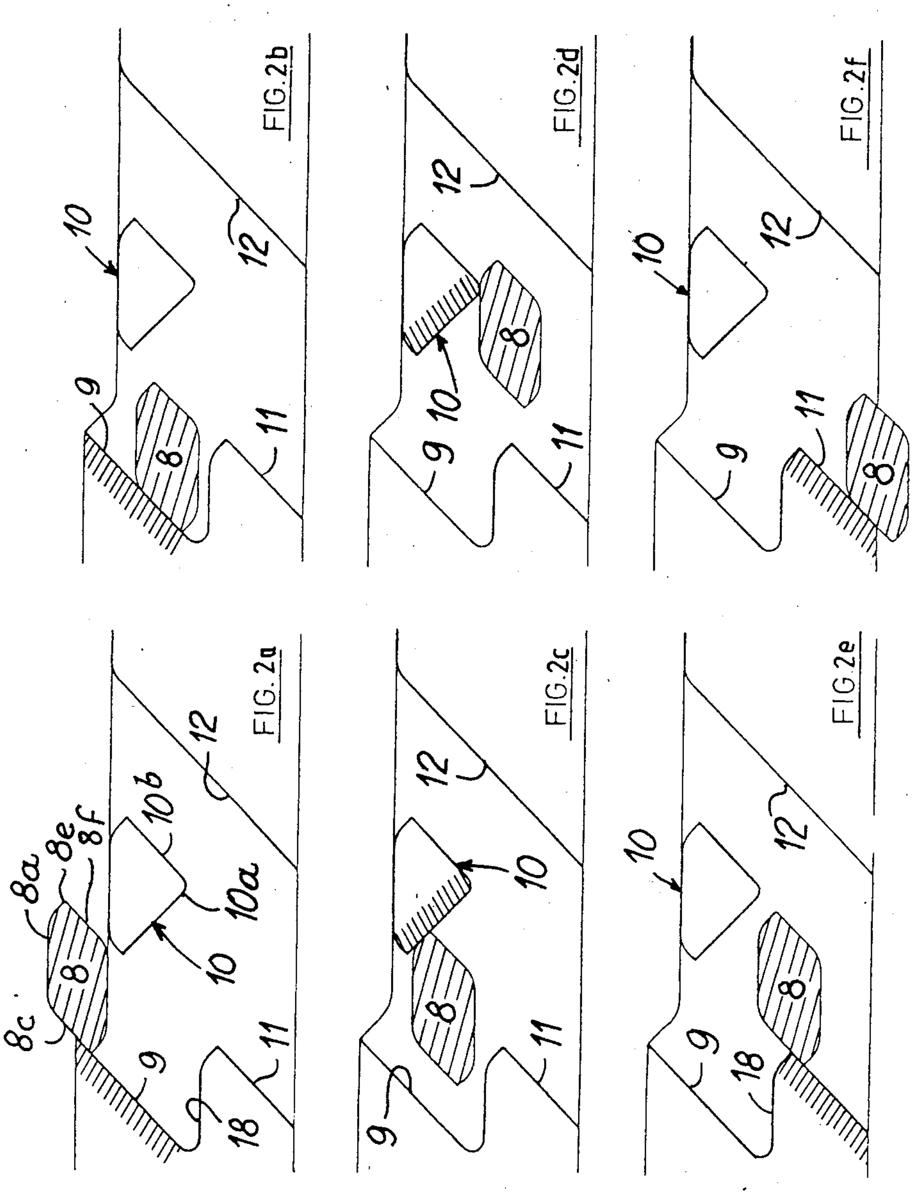
FIG. 2 is a partial side elevational view of the actuator of FIG. 1.
Figures 2G, 2H, 2J, 2K, 2L:
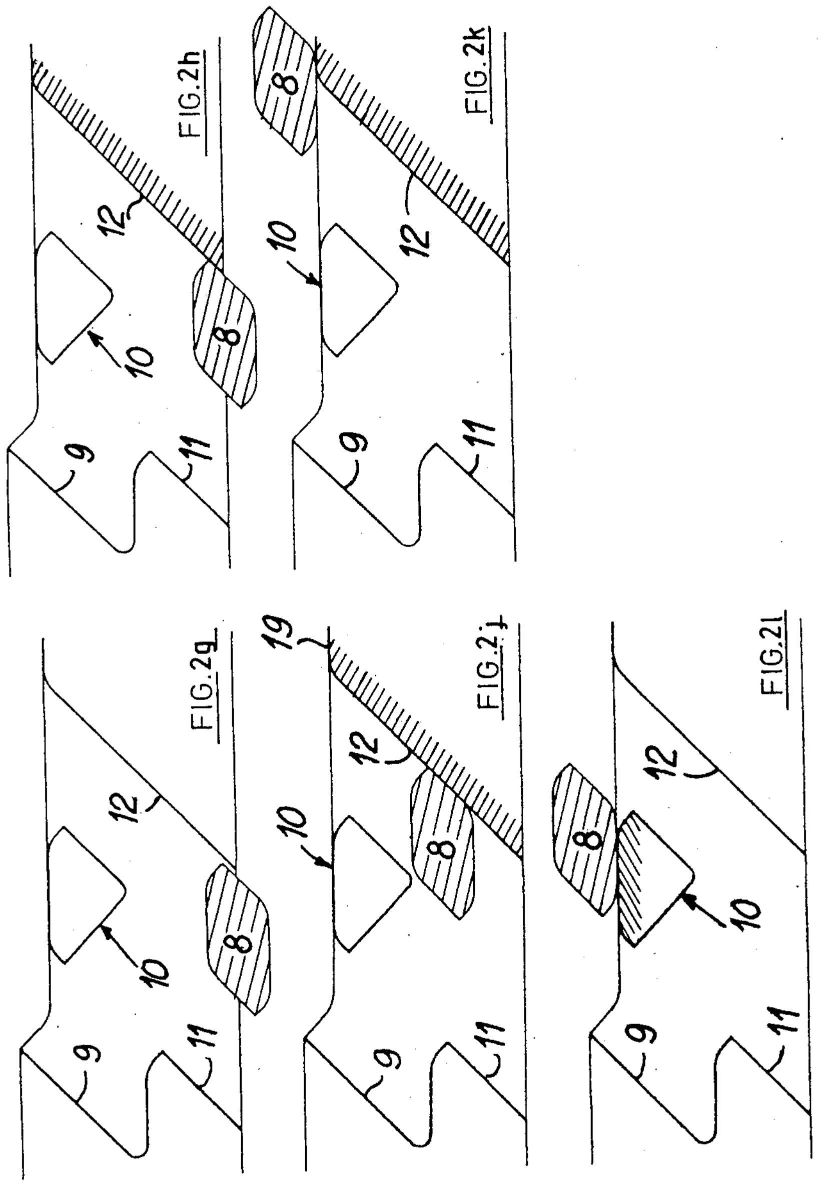
Figures 3A, 3B, 3C, 3D, 3E, 3F:
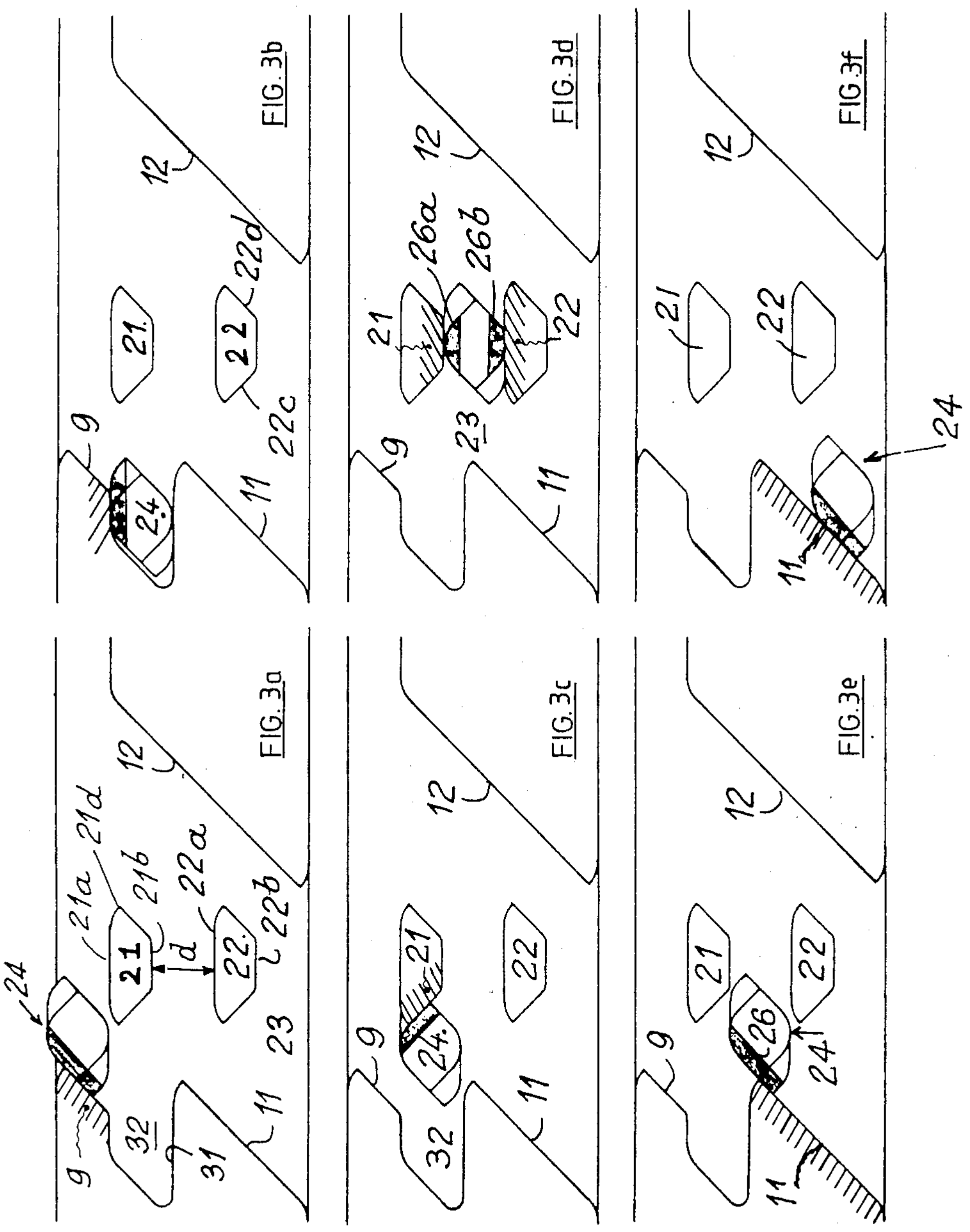
FIG. 3 is a partial top plan view of the actuator of FIGS. 1 and 2 shown in the locked and bolted position.
Figure 4:
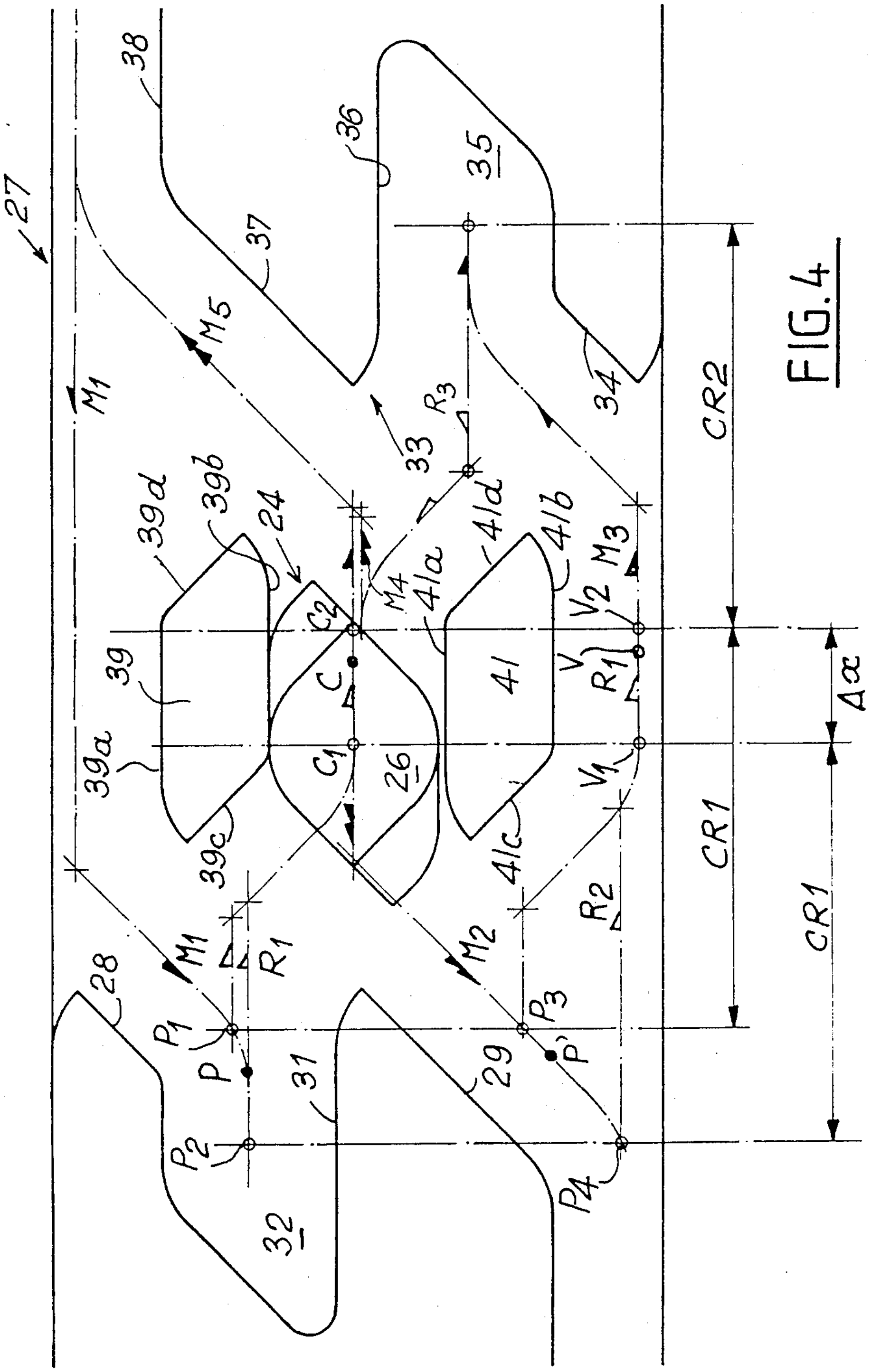

FIGS. 2*a, b, c,.d, e, f, g, h, j, k, l* are partial diagrammatic elevational views of the different relative positions of the stud of the nut and of the cam during one complete cycle of operation of the actuator of FIGS. 1 to 3;

FIGS. 3*a, b, c, d, e, f, f', g, h, j, k, l* are views similar to FIGS. 2*a* to 2*l* of a complete operational cycle of an actuator according to a second embodiment of the stud and cam;

FIG. 4 is an elevational view to an enlarged scale of a third embodiment of the cam of the actuator according to the invention, with arrows indicating the paths through which the stud can travel in this cam, and FIG. 5 shows a variant of the construction of the stud.

The actuator shown in FIGS. 1 to 3 is adapted to ensure the locking-unlocking of a vehicle door latch and comprises the following elements, disposed in a case 1:

(a) an electric motor 2 capable of driving in rotation a reversible lead-screw 3 on which is mounted a carriage 4 which is freely slidable and mechanically connected through a control end member 5 to a lever (not shown) for locking the latch; the ends of the lead-screw 3 are journalled in the walls of the case 1, one of the walls of the latter being traversed by the end-member 5 connected to the carriage 4;

(b) a nut 6 mounted on the lead-screw 3 inside the carriage 4, and prevented from rotating by a guiding thereof inside the carriage, for example by means of a groove (not shown) of the carriage 4 in which is slidable a slide 6*a* of the nut 6. The nut 6 is provided, on one hand, with an elastically yieldable element 7, for example formed by a coil spring one end of which is connected to the nut 6 while the other end is capable of bearing against the end of the carriage opposed to the control end member 5, it being thus compressed between the carriage 4 and the lead-screw 3 so as to bias the nut 6 when this spring 7 is compressed; further, the nut 6 is provided with a stud 8 cooperative with ramps 9, 10, 11 and 12 of a cam 13 which is shown in dotted lines in FIG. 1 movable vertically in the case 1 by the movements in translation of the nut 6 and its stud 8 controlling the cam 13;

(c) this cam 13 is provided with a shoe 15 capable of bolting the carriage 4 in an electrically locked position when it has been shifted to its uppermost position by the stud 8 sliding along the ramps 9, 10, 11, 12, thereby preventing any manual unlocking of the latch.

The electric motor 2 drives the lead-screw 3 in either direction through a gear pinion 14*a* which is engaged with a gear wheel 14*b* rigid with the lead-screw 3 on which the carriage 4 is freely slidable. The cam 13 can remain in equilibrium in the position to which the combined action of the stud 8 and of any one of the aforementioned ramps brought it, by means (not shown in the embodiment of FIGS. 1 to 3), which may be merely the friction of the cam 13 on the walls of the case 1.

The carriage 4 is provided, at its end adjacent to the gear wheel 14*b* and which faces the spring 7, with a heel 16 cooperative with the shoe 15 for bolting the carriage 4 in the electrically locked position of the latch.

The cam 13 is provided with the following ramps:

(a) a first ramp 9 inclined in the direction of the unlocked position y (FIG. 1) of the control end member 5 and of the locking lever; the stud 8 (FIG. 2*a*) includes two superimposed horizontal faces 8*a*, 8*b*, two inclined faces 8*c*, 8*d* interconnecting the faces 8*a*, 8*b* on the side adjacent the ramp 9 and two inclined faces 8*e*, 8*f* connecting the faces 8*a*, 8*b* on the opposite side. Consequently, the stud 8 can, when it is driven toward the ramp 9 by the motor 2 in the direction of the locking position x, slide along the ramp 9 by its inclined face 8*c* and thus raise the cam 13 in vertical translation while the nut 6 continues its displacement by compressing the spring 7 against the carriage 4;

(b) the cam 13 is provided with a second ramp 10 formed on a member 17 which projects inwardly of the wall of the case 1 and is separated from the first ramp 9 by a gap which is sufficient to permit the passage of the stud 8 between these two ramps 9, 10 during the vertical translation of the cam 13 under the thrust exerted by the stud 8; the ramp 10 is divided into two ramps 10*a*, 10*b* inclined in a V configuration, the ramp 10*a* having the same inclination as the face 8*e* of the stud so as to be cooperative with the latter;

(c) the cam 13 comprises a third ramp 11 having the same inclination as the ramp 9 which it extends and from which it is separated by a substantially horizontal step 18, the ramp 11 being therefore inclined as the ramp 9 in the unlocking direction of the lever;

(d) the cam 13 is provided with a fourth ramp 12, separated from the second ramp 10 by a gap permitting the passage of the stud 8 between these two ramps, substantially in a direction parallel to the first ramp 9 and to the third ramp 11 but inclined in the locking direction, shown by the arrow C in FIG. 1. The fourth ramp 12 is extended by a fifth ramp 19 parallel to the direction of displacement CD of the locking-unlocking lever and on which the stud 8 can slide into the latch unlocking position (FIG. 2*k*).

The actuator just described operates in the following manner.

(1) Electric locking

The control end member 5 is in the unlocked position y, the cam 13 being in its lower position (Fis. 1, 2 and 2*k*) with the shoe 15 in the lowered position 15*a*. The stud 8 is shifted forwardly, i.e. toward the right in the Figures, by slidably bearing against the ramp 19.

The motor 1, supplied with power in the required direction, causes, through the gear pinion 14*a*, the gear wheel 14*d* and the lead-screw 3, the translation of the nut 6 toward the rear, i.e. toward the gear wheel 14*b*. The nut 6 thus drives, through the spring 7 whose free end bears against the carriage 4, the latter and consequently the latch from the unlocked position y to the position x, the stud 8 coming into contact by its face 8*c* with the ramp 9 (FIG. 2*a*).

The nut 6 continues its travel and compresses the spring 7 until it abuts against the carriage 4. The sliding of the stud 8 on the ramp 9 obliges the cam 13 to effect a first vertical translation in the upward direction (FIG. 2*b*). When the supply of the motor 2 is cut off by electronic means known per se, the spring 7, in bearing against the carriage 4, urges the nut 6 in the forward direction (in the direction of arrow D) owing to the reversibility of the assembly. The stud 8 leaves the ramp 9 and engages by its face 8*e* the ramp 10*a*, and thus produces a second upward translation of the cam 13 (FIGS. 2*c* and 2*d*) whose shoe 15 comes into a position 15*b* below the heel 16 (FIG. 2). The assembly is then in equilibrium in the locked position ready for any one of the following operations: electric bolting, electric unlocking, manual unlocking.

(2) Electric bolting

In starting in the position of FIG. 2*d* in which the latch is electrically locked, a new actuation of motor 2 in the same direction results in a new rearward travel of the nut 6 in a direction parallel to the locking direction C, and its stud then comes into contact by its face 8*c* with the ramp 11, which causes a new upward sliding of the cam 13 (FIGS. 2*e* and 2*f*). The cam 13 thus moves upwardly through a travel sufficient to bolt by its shoe 15 the heel 16 of the carriage 4 (FIG. 2 in which the shoe occupies the position 15*c* in front of the heel 16, and FIG. 3), which prevents any manual translation of the carriage 4 and therefore the manual unlocking of the latch, even after a possible breaking of the window glasses of the vehicle (FIG. 2*f*).

As the motor 2 no longer carries current, the spring 7 returns the nut 6 and its stud 8 to their position of equilibrium (FIG. 2*g*), while the cam 13 continues to bolt the carriage 4.

The only possible following stage is then the electric unbolting.

(3) Electric unbolting

In starting in the bolted position (FIG. 2*g*), a new supply of power to the motor 2 in the appropriate direction urges the nut 6 forwardly. The stud 8 then enters into contact by its inclined face 8*f* with the ramp 12 (FIG. 2*h*) and consequently causes the cam 13 to slide downwardly in the wall of the case 1. In a first stage, the shoe 15 therefore releases the heel 16 and consequently the carriage 4, the shoe 15 assuming the position 15*b* (FIG. 2), then the nut 6, in continuing its forward travel (FIG. 2*j*) comes into bearing relation to the carriage 4 so as to bring it from the locked position x to the unlocked position y, while its stud 8 arrives by its lower face 8*b* on the ramp 19 (FIG. 2*k*). The latch is then electrically unbolted and in the unlocked position.

(4) Electric unlocking

In starting with the position of the actuator illustrated in FIG. 2*d*, reached after an electric locking, the nut 6, driven forward in the direction of arrow D by the motor 2, shifts the carriage 4 while the stud 8 is in contact with the ramp 12 (FIG. 2*j*). The carriage 4 thus passes from the locked position x (FIG. 2*d*) to the unlocked position y (FIG. 2*k*) while the cam 13 returns to its lowermost position. After the supply of the motor 2 has been cut off, the assembly is in equilibrium in the unlocked position ready for one of the following operations: manual locking, electric locking.

It should be mentioned that, in the case of an electric unlocking succeeding a manual locking, the procedure is identical apart from the movements of the cam 13, the latter resting in the lowermost position during the locking (position of FIG. 2*l*).

(5) Manual locking

In starting in the unlocked position x (FIG. 2*k*), it is possible to manually lock the latch by depressing the trimming push-member, and therefore the control end member 5, in the rearward direction indicated by the arrow C. As the motor 2 is not supplied with power, the carriage 4 is then urged from the position y to the position x which, owing to the reversibility of the assembly, drives the nut 6 in the rearward direction without the stud 8 having the least action on the cam 13 (FIG. 2*l*). The assembly is then in equilibrium in the manually locked position, the stud 8 being in contact by its lower face 8*b* with the upper horizontal face of the member 17, ready for one of the following operations: electric bolting (after electric locking), electric unlocking, a manual unlocking.

(6) Manual unlocking

After the electric locking, the starting situation of the actuator is illustrated in FIG. 2*d*, which corresponds to the locked position x. As the motor 2 is not supplied with power, the carriage 4 is pulled by its control end member 5 from the position x to the position y, which drives the nut 6 in the forward direction owing to the reversibility of the device. The stud 8 comes into contact with the ramp 12 by its inclined face 8*f* (FIG. 2*j*) and thus causes the cam 13 to slide to its lowermost position (FIG. 2*k*).

The assembly is in equilibrium in the unlocked position ready for one of the following operations: electric locking, manual locking.

It will be observed that, in the case of a manual unlocking following on a manual locking, the procedure is identical apart from the movements of the cam 13 which remains in the lowermost position during the locking (FIG. 2*l*, from which position the cam moves for arriving at the position shown in FIG. 2*k*).

Figures 3F, 3G, 3H, 3J, 3K, 3L:
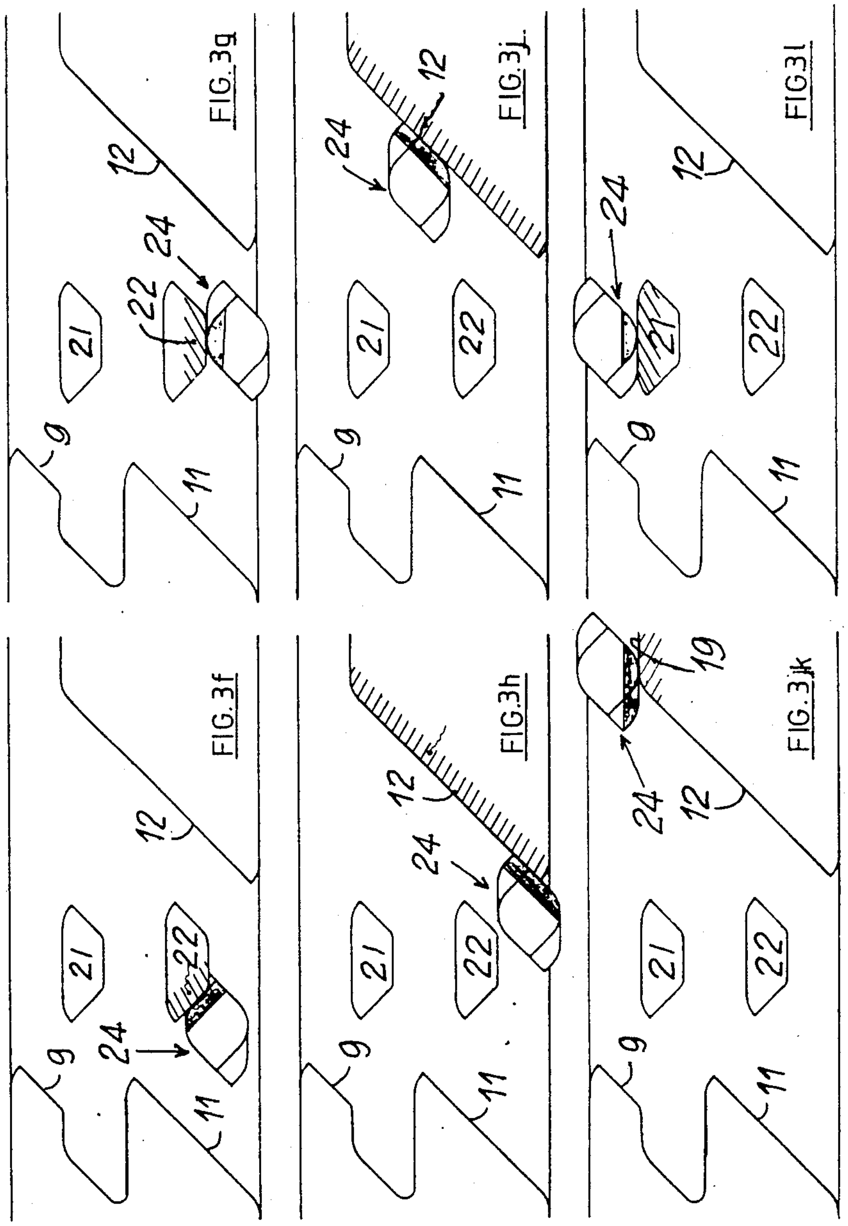

FIGS. 3*a*, 3*l* show a second embodiment of the stud of the nut 6 and the second central ramp 10.

The latter is here formed by two projections 21, 22 of the cam 23, disposed one above the other and projecting inwardly of the case 1, these projections being separated by a distance d allowing the passage therebetween of the stud 24 of the nut 6. The projections 21, 22 thus respectively have two superimposed horizontal faces 21*a*, 21*b* and 22*a*, 22*b*, interconnected by two faces of opposed inclinations respectively 21*c*, 21*d* and 22*c*, 22*d*, so shaped as to permit the sliding of the stud 24 therealong.

The stud is formed in two parts, namely a first part 25 shaped in a way similar to the stud 8 of the preceding embodiment, and a second part constituted by a finger member 26 (FIG. 5) projecting from the part 25, which has a first series of faces having the same inclination as the first ramp 9, third ramp 11 and fourth ramp 12, while the second series of faces is provided on the finger member 26 and adapted to slide on the projections 21, 22 which are correspondingly shaped, constituting the second ramp. The finger member 26 is thus provided with two horizontal faces 26*a*, 26*b* interconnected by four inclined faces in a V configuration.

The cycle of operation 3*a* . . . 3*l* is similar to that illustrated in FIGS. 2*a* to 2*l* but also permits, owing to the features described hereinbefore, the immobilization of the cam 23 in the locked position (FIG. 3*d*) achieved by the interposition of the finger member 26 between the projections 21, 22 against which it bears by its upper and lower faces 26*a*, 26*b* in the bolted position (FIG. 3*g*) in which the finger member 26 is located below the projection 22 with which it is in contact by its upper face 26*a*, and in the unlocked position (FIG. 3*k*) in which the part 25 is in contact with the ramp 19. Thus it will be understood that the projections 21, 22 and the profiled finger member 26 prevent the cam 23 from undergoing any movemcnt outside those produced by the action of the stud 24.

Further, the arrangement of the ramps of the cam 23 permits the operation of the system, in particular the bolting of the heel 16 by the shoe 15, for a locked position x of the carriage 4, which varies within a range of a few millimeters. This allows a less precise positioning of the actuator on the latch (the positions x and y being defined by the abutments of the interior locking lever on the latch and not by the actuator).

The third embodiment of the actuator illustrated in FIG. 4 permits the combination of the "locking, unlocking, bolting and unbolting" states in accordance with a sequence different from that described before, so as to satisfy other functional requirements which may arise.

In the cam 27 (FIG. 4), the first ramp 28 and the third ramp 29 are similar to the ramps 9 and 11 of FIG. 3*a* to 3*l* and are in the same way interconnected by a step 31 defining between these two ramps a cavity 32 adapted to receive the stud 24 which is identical to that of FIGS. 3*a*–3*l*. On the other hand, the fourth ramp 33, provided adjacent to the control end member 5, has a geometry similar to that of the profile of the elements 28, 31, 32, 29, but inverted, i.e. it comprises a lower part 34 similar to the ramp 28, arranged at the level of the shoe 15 and the third ramp 29, a cavity 35 corresponding to the cavity 32, an upper step 36 corresponding to the step 31, an upper ramp 37 corresponding to the ramp 29 with the same inclination, and a horizontal end ramp 38.

Further, the projections 21, 22 are here replaced by two lugs 39, 41 which are identical and separated by a gap allowing the passage of the stud 24 and respectively having two parallel horizontal faces 39*a*, 39*b*, 41*a*, 41*b*, and two parallel lateral faces 39*c*, 39*d*, 41*c*, 41*d*. The faces 39*c* and 41*c* have the same inclination as the corresponding profiled faces of the finger member 26 and have ihclinations respectively opposed to those of the facing ramps 28, 29 and 34, 37.

In addition, the actuator is provided with a second spring (not shown) similar to the spring 7 and interposed between the nut 6 and the end of the carriage 4 remote from that against which the spring 7 acts.

The path which may be followed by the stud 24 and its finger member 26 in the cam 27, resulting from successive actuations of the motor 2, is diagrammatically represented by the arrowed circuit in which the successive actuations of the motor and the displacements produced by the returns brought about by the two springs are referred to as follows: the parts of the path provided with single arrows M1 are travelled through as a result of the first actuation of the motor, the parts of the path carrying the double arrows M2 are followed after a second actuation in the same direction of the motor, the parts provided with a single arrow having the reference R1 are travelled through as a result of the action of the first return spring 7, the part having the reference R3 is travelled through as a result of the action of the second return spring, the references M4 and M5 indicate the path travelled through by the stud 24 from its locking position C to its unlocking position D without passing through the bolting position D.

CR1 is the travel of the return spring 7, CR2 is the travel of the second return spring. Δx is the variation of the locked position x of the carriage 4 relative to the cam 27, it is therefore equal to the maximum value of the clearance J between the heel 16 of the carriage 4 and the shoe 15 of the cam (FIGS. 2 and 3). This variation Δx corresponding to the variation of the positioning of the actuator on the latch.

The cycles of operation of this sytem are the following:

Locking-unlocking: in starting at the locked position D, an actuation M1 of the motor is effected so as to displace the stud 24 rearwardly until it is made to slide on the first ramp 28 and then to a position P between the end of the cavity 32, where the centre of the stud occupies the position P and P1 and P2. After the supply of the motor has been cut off, the spring 7 returns the stud 4 (path R1) to the locked position C between C1 and C2 in which the stud 24 is stopped between the lugs 39, 41, against which bears its finger member 26. If it is then desired to return to the unlocked position D, a second actuation M4 of the motor is effected in the direction opposed to the preceding direction and the stud 24 follows the path M4, M5 between the lug 39 and the ramp 37 along which it slides to the position D.

Bolting: in starting at the locked position C, a second actuation M2 of the motor is effected in the same direction as the preceding actuation M1, so that the stud 24 slides along the ramp 29 to a point P between P3 and P4, thereby raising the cam 27 to its position in which the carriage 4 is bolted. After cutting off the supply to the motor, the spring 7 returns the stud 24 to its bolted position V (between V1 and V2) under the lug 41 by causing it to follow the path R2, the spring 7 effecting the travel CR1.

Unbolting (return to the locked position): in starting at the bolted position V which was obtained, a first actuation M3 of the motor is effected in the direction which causes the stud 24 to slide along the ramp 34 until it is placed in the cavity 35. At the same time, the nut 6 shifts through the second spring, the carriage 4 in the unlocking direction represented by the arrow D, until the heel 16 of the carriage 4 abuts against the shoe 15 of the cam 27 and thus reduces the clearance J to zero (FIGS. 2 and 3). After the supply of the motor has been cut off, the second spring returns the nut 6 and the stud 24 to the locked position C2 corresponding to the locked position x of the carriage 4 which is the outermost.

Unlocking: A second actuation M4, M5 of the motor effected in the same direction shifts the stud 24 to the ramp 37 along which it slides and this lowers the cam 27 until the arrival of the stud 24 on the upper ramp 38 in the unlocked position D.

Thus it will be understood that it is possible, after an electric bolting, to cause, after a new electric instruction, the stud 24 and therefore the cam 27 to pass to the locked position C, and finally to the unlocked position D consecutive to a second actuation of the motor. This passage in two stages from the bolted position V to the unlocked position D was not possible with the two preceding embodiments, in which the electric unbolting instruction indeed automatically and necessarily brings the stud 8, 24 to the unlocked position (FIGS. 2*k* and 3*k*), owing to the configuration of the ramp 12. This advantage of the embodiment of FIG. 4 is thus made possible by the special geometry of the fourth ramp 34, 37 and the presence of a second return means for the carriage 6.

Such an arrangement consequently permits the use of an electric break-down detecting system which automatically returns the assembly from the bolted position to the merely locked position, which affords the possibility of a mechanical aid by means of the key or the trimming edge pull-member.

It must be understood that the scope of the invention is not intended to be limited to the embodiments described hereinbefore and may encompass many modifications.

What is claimed is:

1. A locking actuator for a vehicle door latch, said actuator comprising a case and the following elements disposed within said case:

(a) a reversible lead-screw, an electric motor drivingly connected to the lead-screw, a carriage freely slidably mounted on the lead-screw, and a latch locking control end member mechanically connected to the carriage;

(b) a nut located within the carriage and screwthreadedly engaged with the lead-screw guide means in the carriage cooperative with the nut to prevent the nut from rotating relative to the carriage, elastically yieldable and compressible means interposed between the carriage and the lead-screw and cooperative with the nut so as to return the nut when said yieldable means is compressed, a stud provided on the nut, a cam defining ramps and vertically movable in the case by movements in translation of the nut and the stud controlling the cam, the stud being cooperative with the ramps of the cam;

(c) said cam being provided with a shoe capable of bolting the carriage in the electrically locked position when the cam has been shifted to its uppermost position by the stud sliding on said ramps, so as to prevent any manual unlocking of the latch.

2. An actuator according to claim 1, wherein the carriage is provided with a heel capable of cooperating with the shoe of the cam for bolting the carriage in the electrically locked position of the latch.

3. An actuator according to claim 1, comprising means for enabling the cam to remain in one position it is capable of occupying by sliding in the case under the combined action of the stud and one of the ramps of the cam.

4. An actuator according to claim 1, wherein the cam comprises:

(a) a first ramp inclined in the direction of the unlocked position of the control lever so that the stud driven toward said ramp by the motor in the locking position can slide along said first ramp and thus raise the cam in vertical translation while the nut continues its displacement and compresses said elastically yieldable means against the carriage;

(b) a second ramp, a gap separating the second ramp from the first ramp, the gap being sufficient to permit the passage of the stud between the first and second ramps during vertical translation of the cam under thrust exerted by the stud, and along which the stud is slidable after cutting off electric power supply to the motor so that it is urged back by the release of the elastically yieldable means of the nut until the stud occupies under said second ramp an electric locking position of the latch;

(c) a third ramp extending the first ramp, a step separating the third ramp from the first ramp, the third ramp being also inclined in the unlocking direction so that the stud, after a new driving of the nut to said third ramp by the motor, can slide therealong and cause the cam to effect a vertical movement of translation at the end of which movement the cam bolts the carriage, after which the release of the elastically yieldable means is operative to return the nut and the stud to a position of equilibrium, whereas the latch remains bolted;

(d) and a fourth ramp, a gap separating the fourth ramp from the second ramp, gap allowing passage of the stud therebetween substantially parallel to the first ramp and to the third ramp and inclined in the locking direction, so that the stud, in starting at its bolting position of equilibrium, can be driven by the motor by sliding along the fourth ramp and cause the cam to effect a downward movement of translation which unbolts the carriage until the stud completely leaves the ramps and reaches a position permitting the unlocking.

5. An actuator according to claim 4, wherein the stud has profiled sides to enable it to slide on the first ramp, the second ramp, the third ramp, and the fourth ramp of the cam.

6. An -actuator according to claim 4, comprising a fifth ramp extending from said fourth ramp parallel to the direction of displacement of the locking-unlocking lever and extending the fourth ramp, the stud sliding on the fifth ramp to the unlocked position of the latch.

7. An actuator according to claim 4, wherein said second ramp is at a distance allowing the passage of the stud and having such profiles as to permit the sliding of the stud, and the stud comprises a finger member projecting from the stud, tow series of faces, namely a first series formed by faces having the same inclination as said first, third and fourth ramps and adapted to slide therealong, and a second series of faces as in the second range provided on the finger member and adapted to slide along the projections which are profiled in correspondence with the second ramp, said projections functioning to immobilize the cam in selectively locked position and unbolted position.

8. An actuator according to claim 7, comprising a first step interconnecting the first ramp and the third ramp, said step defining between said two ramps a first cavity adapted to receive the stud, the fouth ramp, comprising a lower part arranged substantially at the level of the shoe of the cam and substantially at the level of the third ramp, and having the same profile as the first ramp, an upper part of of the fourth ramp having the same profile as the third ramp, a second step interconnecting the uppper part of the fourth ramp and the lower part of the fourth ramp, the second step partly defining a second cavity, each projection being provided with two inclined and parallel lateral faces on which faces associated faces of the stud and the projecting finger member are capable of sliding.

* * * * *